United States Patent
Girardi (12) 
(10) Patent No.: US 12,446,731 B2
(45) Date of Patent: Oct. 21, 2025

(54) GRINDING APPARATUS AND METHOD

(71) Applicant: GIRARDI S.R.L., Spinea (IT)

(72) Inventor: Egidio Girardi, Venice (IT)

(73) Assignee: GIRARDI S.R.L, Spinea (IT)

( * ) Notice: Subject to any disclaimer, the term of this patent is extended or adjusted under 35 U.S.C. 154(b) by 240 days.

(21) Appl. No.: 18/180,722

(22) Filed: Mar. 8, 2023

(65) Prior Publication Data
US 2023/0248181 A1    Aug. 10, 2023

Related U.S. Application Data

(63) Continuation-in-part of application No. 16/626,871, filed as application No. PCT/IT2019/050069 on Mar. 29, 2019, now abandoned.

(30) Foreign Application Priority Data

Mar. 30, 2018   (IT) .................. 102018000004111

(51) Int. Cl.
| | |
|---|---|
| *A47J 42/36* | (2006.01) |
| *A47J 42/16* | (2006.01) |
| *A47J 42/38* | (2006.01) |
| *A47J 42/40* | (2006.01) |
| *A47J 42/50* | (2006.01) |
| *B08B 5/00* | (2006.01) |

(52) U.S. Cl.
CPC ............... *A47J 42/36* (2013.01); *A47J 42/40* (2013.01); *A47J 42/50* (2013.01); *B08B 5/00* (2013.01)

(58) Field of Classification Search
CPC .. A47J 42/36; A47J 42/40; A47J 42/52; A47J 42/16; A47J 42/38
See application file for complete search history.

(56) References Cited

U.S. PATENT DOCUMENTS

| | | | |
|---|---|---|---|
| 3,610,540 A | 10/1971 | Krolopp et al. | |
| 6,339,985 B1 * | 1/2002 | Whitney | A47J 31/505 99/290 |
| 2015/0238040 A1 * | 8/2015 | Marchi | A47J 31/42 241/257.1 |

(Continued)

FOREIGN PATENT DOCUMENTS

| | | |
|---|---|---|
| EP | 3295843 A1 | 3/2018 |
| WO | 2014045230 A1 | 3/2014 |
| WO | 2017055433 A1 | 4/2017 |

OTHER PUBLICATIONS

International Search Report from PCT/IT2019/050069 dated Jun. 25, 2019 (10 pages).

(Continued)

*Primary Examiner* — Mohammed S. Alawadi (74) *Attorney, Agent, or Firm* — Calfee, Halter & Griswold LLP (57) ABSTRACT

A method for use of an apparatus comprises: a grinding step, a cleaning step, and a de-ionizing step; the apparatus comprises a receptacle to contain the product to be ground and provided with an unloading aperture; a fixed grinder; a mobile grinder rotatable around a rotation axis connectable to a drive motor; a cleaning device connected to the mobile grinder; a grinding chamber in which the fixed grinder, the mobile grinder and the cleaning device are located and provided with a discharge aperture to discharge the ground product.

13 Claims, 4 Drawing Sheets

(56) References Cited

U.S. PATENT DOCUMENTS

2017/0181568 A1\* 6/2017 Wang ................. A47J 42/06
2020/0060477 A1\* 2/2020 Nicholson ............ A47J 42/36

OTHER PUBLICATIONS

Office Action from U.S. Appl. No. 16/626,871 dated Jul. 12, 2021.
Office Action from U.S. Appl. No. 16/626,871 dated Nov. 2, 2021.
Office Action from U.S. Appl. No. 16/626,871 dated Apr. 4, 2022.
Office Action from U.S. Appl. No. 16/626,871 dated Sep. 8, 2022.

\* cited by examiner fig. 1 fig. 2 fig. 3 fig. 4 fig. 5 fig. 6
(PRIOR ART)

GRINDING APPARATUS AND METHOD

CROSS-REFERENCE TO RELATED APPLICATIONS

This application is a continuation in part of U.S. application Ser. No. 16/626,871, filed on Dec. 26, 2019, which is a 371 of PCT Application No. PCT/IT2019/050069 filed on Mar. 29, 2019, which claims priority to Italian Application No. 102018000004111 filed on Mar. 30, 2018, the contents of which are hereby incorporated by reference as if recited in their entirety.

FIELD OF THE INVENTION

The present invention concerns a grinding apparatus and its method of use and, in particular but not exclusively, an electric grinding apparatus suitable to grind coffee beans, or other product, in particular a granular product, so as to obtain a ground product, for example a ground powder product.

BACKGROUND OF THE INVENTION

Known grinding apparatuses, for example electric coffee grinders, generally comprise a main body provided at the upper part with a hopper where the product to be ground is loaded, a motor located in the lower part in the main body and a grinding device located in a central zone of the apparatus.

The grinding device is positioned in a grinding chamber and can comprise grinders or grinding wheels which can have any shape, for example they can have a conical shape or a flat shape, and the ground product can exit from an unloading mouth located downstream of the grinding device.

The grinding device can comprise a fixed grinder and a mobile grinder, below which blades can be made which have the purpose of generating an unloading action of the ground product from the grinding chamber both by mechanical action, that is, by contact, and also by means of an air flow generated in the grinding chamber. In this way the discharge of the dust that is generated in the unloading compartment of the grinding chamber is obtained.

The blades are suitably shaped to generate the unloading action of the ground product when the mobile grinder is made to rotate and engages on the fixed grinder to grind the product introduced by the hopper.

The removal of the dust or of the ground residues obtained by means of the concave blades associated with the mobile grinder occurs only when the mobile grinder engages on the fixed grinder, that is, when the grinding device is driven to grind the product.

Furthermore, it is normally provided that the mobile grinder can rotate only in the direction of rotation in which the corresponding grinding teeth engage with the grinding teeth of the fixed grinder.

Therefore, in known machines, a certain amount of ground product residues always remains in the unloading compartment of the ground product and, naturally, the presence of such residues in the unloading compartment and therefore in the grinding chamber should be avoided or at least limited as much as possible. In fact, the grinding chamber should ideally be a dosing tank which, during each grinding cycle is first filled with the ground product obtained by the action of the grinders and then fully emptied as the ground product passes in the unloading compartment.

The residues of ground product that remains in the unloading compartment directly affect the quality of the beverage obtained by extraction of the ground product, since its organoleptic characteristics are significantly deteriorated. This is due mainly to the following effects:

oxidation of the residues of the ground product over time,
undesired heating of the ground product due to the fact that this product remains in an internal chamber near the electric motor and the temperature of which may rise also for internal friction generated during use,
the ground product can be grounded more than one time during subsequent grinding cycles so that the granulometry of the product is not the one expected.

These disadvantages are more emphasized and undesirable for continuous load grinding machines or apparatuses, which therefore grind substantially continuously quantities of coffee or other product to be ground. This disadvantage is in any case harmful and undesirable even for grinding machines or apparatuses suitable to grind single doses of coffee, that is, grind predefined quantities of coffee beans.

Trying to overcome some of these disadvantages, in the prior art are also known some grinding apparatus provided with one cleaning member for cleaning the grinding chamber, such as for example the ones disclosed in US patent publication no 2017/0181568 in the name of Wang et al and 2015/0238040 in the name of Marchi et al.

However, even the technical solution described in these patent application cannot ensure a reliable cleaning of the grinding chamber and therefore the latter cannot be fully emptied in spite of the presence of the cleaning member. This is due to the geometry and the shape of the grinding chamber and of the cleaning member, and to the relative arrangement between the chamber and the unloading compartment since steps and undercuts are present, which render difficult to clean the further impervious areas of the chamber.

Other limitations and disadvantages of conventional solutions and technologies will be clear to a person of skill after reading the remaining part of the present description with reference to the drawings and the description of the embodiments that follow, although it is clear that the description of the state of the art connected to the present description must not be considered an admission that what is described here is already known from the state of the prior art.

There is therefore the need to perfect a grinding apparatus and method which can overcome at least one of the disadvantages of the state of the art.

One purpose of the present invention is to provide a grinding apparatus which allows, in a practical and economical manner, to eliminate or at least drastically reduce the presence of possible residues of ground product which tend to deposit in the grinding chamber during the normal grinding process, and remain there even after the end of the grinding process, and which can therefore be used effectively, in particular but not exclusively, for the continuous grinding of coffee, or other product to be ground, for example a granular product.

Another purpose of the present invention is to provide a grinding apparatus which effectively allows to remove the residues of ground product at least from the grinding chamber without entailing significant and complex structural interventions on parts of the apparatus itself.

Another purpose of the present invention is to provide a grinding apparatus which avoid the ground products that remains inside the compartment to be oxidized, and/or to be overheated and/or to be ground too finely due to the fact it is subjected to more than one grinding cycle.

Another purpose of the present invention is to provide a grinding apparatus and method able to ensure that the extraction of the ground product by percolation with water lead to a beverage of good quality, preserving the taste and the organoleptic properties of the ground products.

Another purpose of the present invention is to provide a grinding apparatus which allows to effectively and practically remove the residues of ground product automatically and not only during the normal grinding process, but also and even more effectively at the end of the grinding process itself.

Another purpose of the present invention is to perfect an effective and precise method of use of the grinding apparatus, able to obtain an effective cleaning of the grinding chamber from the residues of ground product.

Another purpose of the present invention is to perfect an effective and precise method of use of the grinding apparatus, by means of which precise quantities of ground product can be obtained, advantageously limiting product waste.

Another purpose of the present invention is to perfect a method of use of the grinding apparatus, in which the ground product maintains its organoleptic characteristics.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a method for use of an apparatus comprising: a receptacle to contain the product to be ground and provided with an unloading aperture; a fixed grinder; a mobile grinder rotatable around a rotation axis connectable to a drive motor; a cleaning device connected to the mobile grinder; a grinding chamber in which the fixed grinder, the mobile grinder and the cleaning device are located and provided with a discharge aperture to discharge the ground product, wherein the method comprises:

a grinding step during which the drive motor rotates the mobile grinder in a first direction of rotation and the grinding teeth of the mobile grinder engage with the grinding teeth of the fixed grinder to ground the product, and in which the cleaning device starts a preliminary unloading step during which a first portion of ground product is discharged through the discharge aperture, a cleaning step in which a commutation device command the drive motor to rotate the mobile grinder in a second direction, opposite the first direction of rotation, in which the grinding teeth of the mobile grinder do not engage with the grinding teeth of the fixed grinder, and in which the cleaning device concludes the unloading step by discharging a second portion of ground product, wherein the first portion and the second portion are complementary one another and form together a dose of ground product;

a de-ionizing step by means of one or more antistatic flaps that eliminate the electrostatic charge associated to the particles of ground product, wherein the one or more antistatic flaps are placed on the discharged path of the ground coffee and the de-ionizing step is carried out after the product passes through the discharge aperture both during the grinding step and the cleaning step.

According to an aspect of the invention, during the cleaning step an air flow is generated during the rotation of the mobile grinder in the second direction that helps the ground product to leave the grinding chamber and overcoming in this manner the braking effect that the antistatic flaps have on the ground product.

According to an aspect of the invention, after the cleaning step the commutation device command the drive motor to rotate the mobile grinder in the first direction again and another grinding step of a subsequent grinding cycle starts.

According to an aspect of the invention, during both the grinding step and cleaning step the ground product, after passing through the discharge aperture, directly drops inside a vertical nozzle, that is inclined to the rotation axis of the mobile grinder of a certain angle comprised between 10° and 50°.

According to an aspect of the invention, an apparatus is provided for grinding a product initially in the form of granules, grains or suchlike, comprising: a receptacle to contain the product to be ground and provided with an unloading aperture; a fixed grinder; a mobile grinder rotatable around a rotation axis and connected to a drive motor, a cleaning device connected to the mobile grinder; a grinding chamber in which the fixed grinder, the mobile grinder and the cleaning device are located and provided with a discharge aperture for discharging the ground product the grinding chamber, the fixed grinder and the mobile grinder defining a reception compartment, put in communication with the unloading aperture, and an unloading compartment, separated from the reception compartment by means of grinding teeth of the fixed and mobile grinders and put in communication with the discharge aperture that is flush with a bottom wall of the unloading compartment, wherein the apparatus comprising:

a control unit, provided with commutation means, and associated with the drive motor so as to make the mobile grinder rotate in a first direction of rotation during a grinding step and, alternatively, in a second direction of rotation, opposite to the first direction of rotation during a cleaning step;

one or more antistatic flaps that eliminate the electrostatic charge associated to the particles of ground product, wherein the one or more antistatic flaps are placed on the discharged path of the ground coffee so that a de-ionizing step is carried out after the product passes through the discharge aperture.

According to an aspect of the invention, the cleaning device comprises at least one cleaning blade which is symmetrical with respect to a radial direction of said cleaning device.

According to an aspect of the invention, the cleaning blade comprises at least a lower cleaning part positioned under the mobile grinder and able to clean the bottom wall, wherein the cleaning part protrudes the radial direction, and reach the proximity of a lateral wall of the unloading compartment so as to clean the entire area of the bottom wall from residues of ground product.

According to an aspect of the invention, the cleaning blade comprises a lateral cleaning part, connected to the lower cleaning part and protruding axially from the cleaning device in a direction that it is parallel to the rotation axis, wherein the cleaning part is adjacent to the lateral wall for cleaning this lateral wall.

According to an aspect of the invention, the cleaning device comprises three cleaning blades reciprocally distanced at an angle of 120°.

According to an aspect of the invention, the rotation axis represents the inclination axis of a main body of the grinding apparatus with respect to a support surface onto which the main body rests through supporting feet.

According to an aspect of the invention, the rotation axis is inclined with respect to the supporting surface by an angle comprised between 15° and 50°.

According to an aspect of the invention, the rotation axis is substantially orthogonal to a direction along which the grinding chamber is directed, so that the grinding chamber is inclined of the same angle comprised between 15° and 50° with respect to the support surface.

According to an aspect of the invention, comprising a nozzle connected with the discharge aperture through a discharge channel, wherein the nozzle extends in a vertical direction.

These and other aspects, characteristics and advantages of the present disclosure will be better understood with reference to the following description, drawings and attached claims. The drawings, which are integrated and form part of the present description, show some embodiments of the present invention, and together with the description, are intended to describe the principles of the disclosure.

The various aspects and characteristics described in the present description can be applied individually where possible. These individual aspects, for example aspects and characteristics described in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Figure 1:
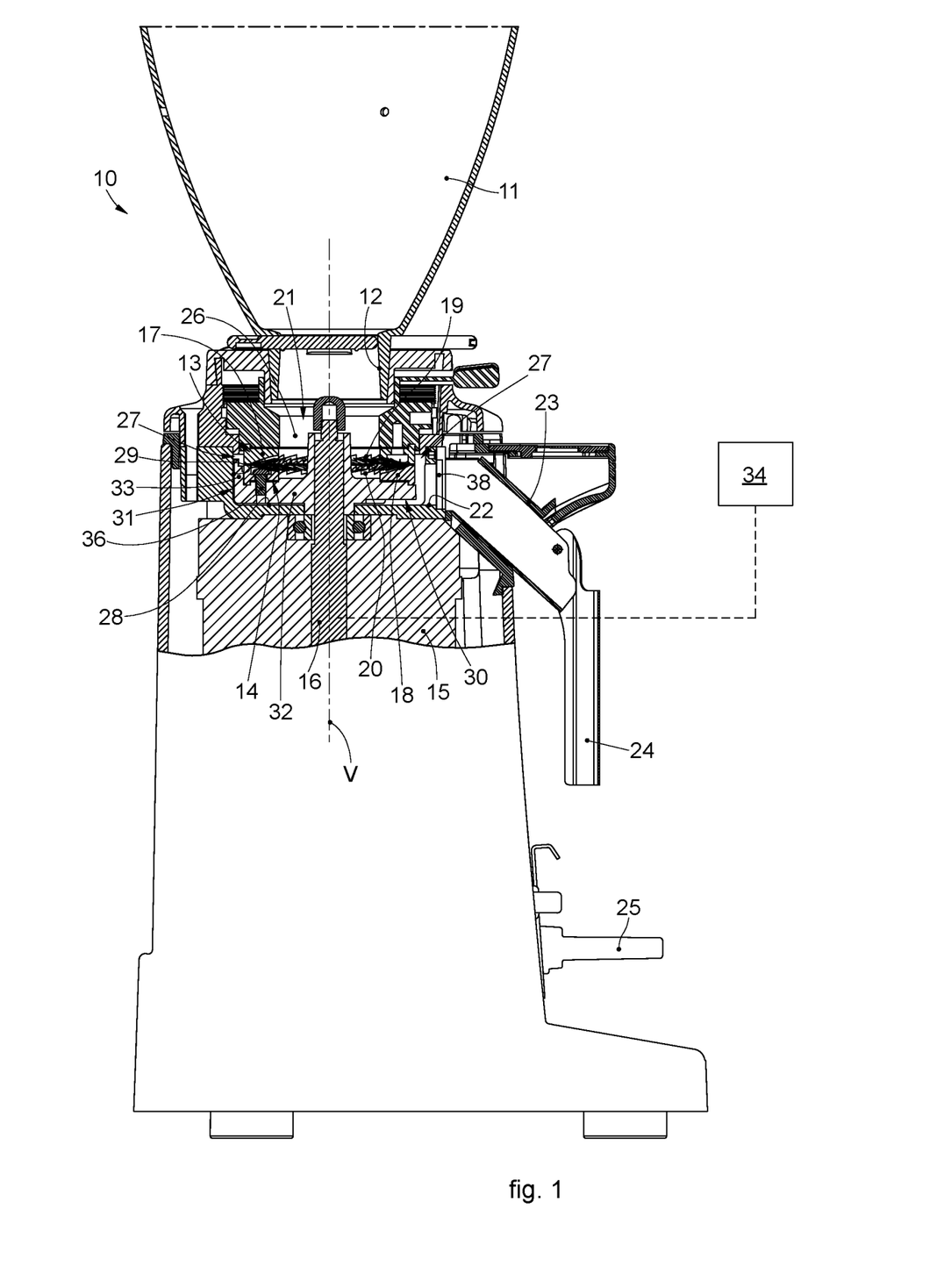
FIG. 1 is a section view of a grinding apparatus according to the invention.

With reference to the embodiment shown in FIG. 1, showing an apparatus 10 for grinding a product initially in the form of granules, grains or suchlike, according to the present invention, the apparatus comprises: a receptacle 11 to contain the product to be ground and provided with an unloading aperture 12. The receptacle 11 can be for example in the form of a hopper or suchlike.

The grinding apparatus 10 also comprises a fixed grinder 13 and a mobile grinder 14 connectable to a drive motor 15 that is housed inside a main body B. The drive motor 15 is configured to make a shaft 16, to which the mobile grinder 14 is connected, rotate around an axis V, so that the mobile grinder 14 can therefore be made to rotate around the axis V.

Figure 3:
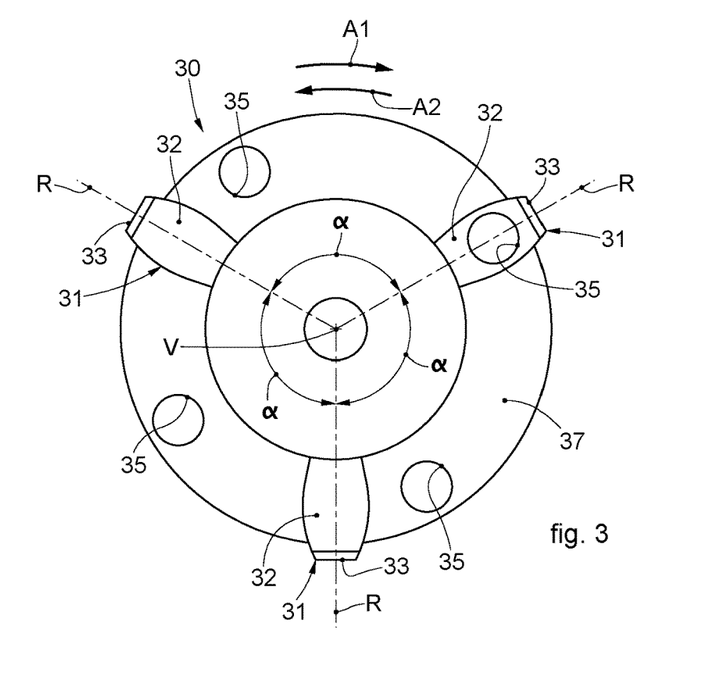
FIG. 3 is a plan view of the cleaning device.

The fixed grinder 13 and the mobile grinder 14 are provided with corresponding supports 17 and 18 on which corresponding grinding teeth 19 and 20 are made, suitable to reciprocally engage in at least one direction of rotation A1, see for example FIG. 3, to grind the product introduced into the receptacle 11.

The fixed grinder 13 and the mobile grinder 14 are positioned inside a grinding chamber 21 located downstream of the unloading aperture 12 of the receptacle 11.

The grinding chamber 21 is provided with a discharge aperture 22 to discharge the ground product.

The discharge aperture 22 to discharge the ground product can be associated with a discharge channel 23, possibly provided with a nozzle 24, which can be directed in a direction parallel to the axis V.

The discharge channel 23 and the nozzle 24 are able to allow an effective transfer of the ground product to a collection receptacle which can be positioned for example in correspondence with a support 25 provided in the grinding apparatus 10.

The grinding chamber 21, the fixed grinder 13 and the mobile grinder 14 define a reception compartment 26 communicating with the unloading aperture 12 of the receptacle 11, and an unloading compartment 27 separated from the reception compartment 26 by means of the grinding teeth 19 and 20 of the fixed grinder 13 and of the mobile grinder 14.

The ground product, and therefore also the possible ground residues to be removed, is substantially collected in the unloading compartment 27. The unloading compartment 27 is therefore in communication with the discharge aperture 22 to discharge the ground product, including possible ground residues.

The unloading compartment 27 comprises at least a bottom wall 28 and at least a lateral wall 29, in this case for example of a cylindrical shape or suchlike.

The bottom wall 28 is flush with the discharge aperture 22 to allow an effective cleaning of the grinding chamber 21, preventing residues of ground product from remaining deposited on the bottom wall 28 of the unloading compartment 27.

Figure 2:
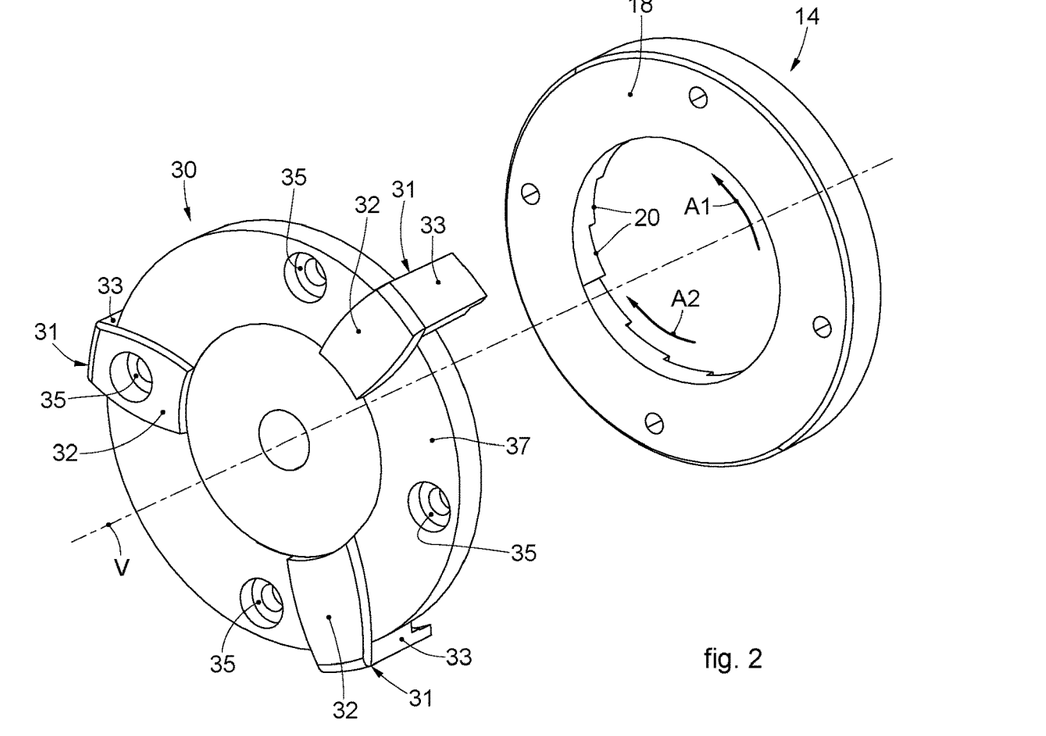
FIG. 2 is a three-dimensional view of a mobile grinder and a cleaning device applicable to the mobile grinder.

The present grinding apparatus 10 also comprises at least a cleaning device 30, see also FIG. 2, associated with the mobile grinder 14 and configured to carry out an effective cleaning of at least the unloading compartment 27, that is, to free the unloading compartment 27 of residues of ground product.

The grinding apparatus 10 also comprises at least a control unit 34 connected to the drive motor 15 of the mobile grinder 14 and provided with commutation means provided to make the mobile grinder 14 rotate in a first direction of rotation A1 which is mainly for grinding and, alternatively, in a second direction of rotation A2 for cleaning, opposite the first direction of rotation A1 and for cleaning, by means of the cleaning device 30, the residues of ground product present in the unloading compartment 27.

Specifically, the commutation means are configured to command the drive of the drive motor 15 in the first direction of rotation A1 and in the second direction of rotation A2.

In the direction of rotation A1, in particular, the grinding teeth 19 and 20 of the fixed and mobile grinders 13 and 14 engage reciprocally so as to grind the product, therefore the direction of rotation A1 is mainly for grinding, however the cleaning device 30 is also active in this direction of rotation A1.

In the direction of rotation A2, the grinding teeth 19 and 20 of the fixed and mobile grinders 13 and 14 do not engage, therefore the product is not ground and therefore the cleaning of the unloading compartment 27 is carried out by means of the cleaning device 30.

The control unit 34 will be provided with an electronic board, or suchlike, and the means to commutate and invert the direction of rotation of the mobile grinder 14 could be managed directly by the electronic board, or they could be made in the form of a double contact relay, or other suitable system that guarantees the inversion in a prompt and effective manner, when commanded by the control unit 34.

The direction of rotation A1 or A2 of the mobile grinder 14 could be established for example by a user interface which the grinding apparatus 10 can be equipped with and provided with a suitable command associated with the control unit 34.

The cleaning device 30 comprises at least a cleaning blade 31 which is symmetrical with respect to a radial direction R of the cleaning device 30, see for example FIG. 3.

The cleaning blade 31 of the cleaning device 30 has the function of generating a mechanical action of thrusting and unloading the powders generated and/or an air flow in the unloading compartment which facilitates the transfer of the residues of ground product toward the discharge aperture 22.

The symmetry of the cleaning blade 31 can, advantageously, allow to use the cleaning device 30 indifferently and with the same cleaning efficiency both in a direction of rotation A1, and also in the other direction of rotation A2.

The cleaning blade 31 comprises a lower cleaning part 32 positioned under the mobile grinder 14 and suitable to clean the bottom 28 of the unloading compartment 27 of residues of ground product.

The lower cleaning part 32 protrudes radially with respect to the cleaning device 30, that is, in a radial direction R, and reach the proximity of the lateral wall 29 of the unloading compartment 27 so as to clean the entire area of the bottom wall 28 from residues of ground product.

The cleaning blade 31 comprises a lateral cleaning part 33, connected to the lower cleaning part 32 and protruding axially from the cleaning device 30 in a direction that it is substantially parallel to the rotation axis V. The lateral cleaning part 33 is adjacent to the lateral wall 29 for cleaning the latter.

In order to guarantee an even more effective cleaning of at least the unloading compartment 27 of the ground product, the cleaning device 30 could comprise a plurality of cleaning blades 31 distanced equally from each other.

One configuration of the cleaning device 30 which has proved to be particularly effective in the cleaning operations of the unloading compartment 27 of residues of ground product, is the one which provides three cleaning blades 31 distanced equally by an angle $\alpha$ of about 120° from each other, see in particular FIG. 3.

The cleaning device 30 could also comprise an annular support 37 which can be removably connected to the mobile grinder 14.

In particular, the annular support 37 can be provided with a series of holes 35 in which to insert attachment elements 36, such as screws or suchlike, which will also engage with the support 18 of the mobile grinder 14.

Lower cleaning part 32 protrudes beyond the perimeter of the annular support 37, as clearly shown in FIG. 3, whilst lateral cleaning part 33 protrudes beyond the thickness of the annular support 37, as clearly shown in FIG. 2.

In the example shown, the grinding apparatus 10 comprises one antistatic flap, which is placed on the discharge path of the ground coffee, in particular between the unloading compartment 27 and the discharge channel 23. By way of example, the antistatic flap 38 is placed near the discharge aperture 22. The flap 38 is configured to eliminate the electrostatic charge associated to the particles of ground product that are created due to the friction between the particles themselves and the grinders 13, 14. This prevents those particles from sticking on the inner wall of the discharge channel 23 and the nozzle 24, which represent area which cannot be easily cleaned nor by any movable member and neither by the operator.

Figure 4:
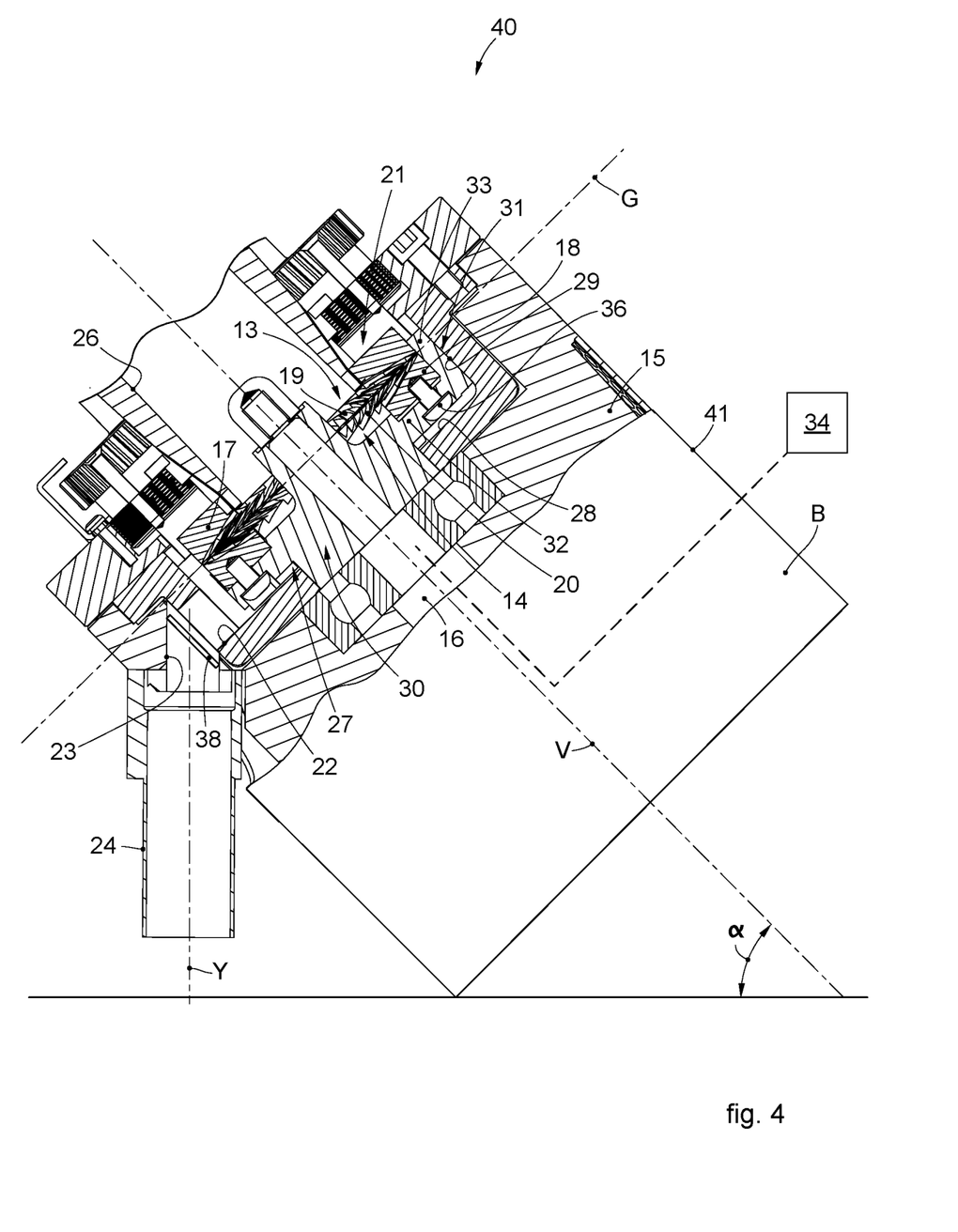
FIG. 4 is a section view of the grinding apparatus according to another embodiment of the invention.

With reference to the embodiment of the invention shown in FIG. 4, another version of a grinding apparatus is shown, that is indicated with reference numeral 40. Parts of the grinding apparatus 40 common to same corresponding parts of the grinding apparatus 10 described above will be indicated by the same reference numerals and their description will not be repeated again for the sake of brevity.

This embodiment differs from the embodiment of FIG. 1 because the rotation axis V represents the inclination axis of the main body B of the grinding apparatus 40 with respect to a support surface onto which the main body B rests through supporting feet.

This main body B comprises an inclined wall 41, which substantially defines the inclination of the grinding apparatus 40 with respect to the support surface.

This rotation axis V is inclined with respect to the supporting surface by an angle $\alpha$ comprised between about 15° and about 50°.

This angle $\alpha$ favors, advantageously, the complete grinding of the product inside the grinding chamber 21 and its correct outflow towards the nozzle 24. This arrangement favors also a complete emptying of the grinding chamber 21 with the aid of the gravity force.

In fact, since the rotation axis V is substantially orthogonal to a direction G along which the grinding chamber 21 is substantially directed, this grinding chamber 21 will also be inclined of an angle $\alpha$ between 15° and 50° with respect to the support surface.

Furthermore, by means of this inclination with this angle $\alpha$, it is possible to position the nozzle 24 along a substantially vertical direction Y and this further favors the discharge of the ground product. In this embodiment, the nozzle 24 is directed along a direction forming an angle to the rotation axis. In the example shown, in which the nozzle 24 extends along a vertical direction Y, this angle has an amplitude equal to the angle α above.

Also in this embodiment the discharge aperture 22, as well as the bottom wall 28 of the unloading compartment 27, are flush with the nozzle 24. In this manner it is possible to avoid any steps or undercuts in the grinding chamber 21, which would hinder the complete outflow of the ground product.

In the following it is described a method of use of the grinding apparatus 10, 40 described above.

Both the grinding apparatus 10, 40 can therefore function in a first direction of rotation, for example the direction of rotation A1, in which a grinding step is carried out during which the grinding teeth 20 of the mobile grinder 14 engage with the grinding teeth 19 of the fixed grinder 13 and therefore the granular product passes from the reception compartment 26, located upstream of the fixed and mobile grinders 13 and 14, to the unloading compartment 27, located downstream of the fixed and mobile grinders 13 and 14, where the ground product then reaches the discharge aperture 22.

During grinding step, whilst the apparatus rotates in the direction of rotation A1, the cleaning device 30 rotates together with the mobile grinder 14 and acts in the unloading compartment 27 to start a preliminary unloading step during which a first portion of the ground product is discharged through the discharge aperture 22.

The mobile grinder 14, in addition to the first direction of rotation A1 and thanks to the control unit 34 provided with commutation means, can be made to rotate in the second direction of rotation A2, opposite the first direction of rotation A1, during a cleaning step.

In this step, the grinding teeth 19 and 20 of the fixed and mobile grinders 13 and 14 do not engage, therefore no further product is ground; however, advantageously, the cleaning device 30 concludes the unloading step by during which a second portion of ground product is discharged so as to carry out an effective cleaning of the unloading compartment 27 of the previously produced ground product, which is thus completely discharged through the discharge aperture 22.

The first portion and the second portion are complementary and form together a dose of ground product having a weight pre-set by the operator, that is the quantity necessary to subsequently obtain a beverage.

During the unloading of the ground product, either in the grinding step or in the cleaning step, a step of de-ionizing the ground product is carried out by means of the one or more antistatic flaps 38. The latter is placed on the discharge path of the ground coffee and thus theoretically could act as a braking element that would hinder the passage of the ground coffee towards the nozzle 24.

However, the air flow generated by the rotation of the mobile grinder 14 and of the cleaning device 30 contrast the braking effect of the antistatic flap 38, so that the flap 38 do not hinder the outflow of the ground product.

Figure 5:
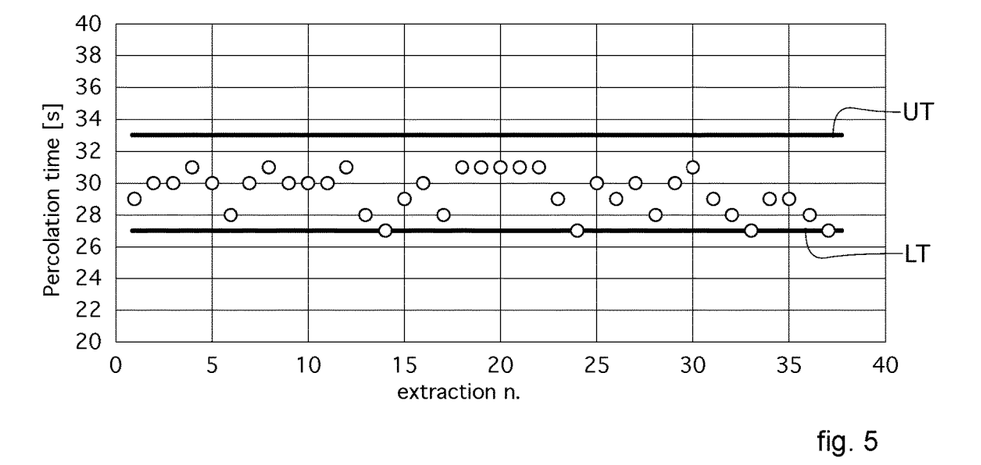
FIG. 5 and FIG. 6 are charts which put in comparison the outcome of the method according to the invention with solution known in the art.

In the embodiment of the invention shown in FIGS. 4 and 5, this effect is also enhanced by the inclination of the grinding chamber 21 of the angle α, which favors the exit of the ground coffee through the aperture 22 towards the vertical nozzle 24.

The cleaning device 30, therefore, advantageously, acts in both directions of rotation A1 and A2 to carry out the cleaning operations of the unloading compartment 27.

The inversion of the direction of rotation from A1 to A2, for example, can also be commanded automatically the moment the grinding process in the direction of rotation A1 is stopped, so as to make the cleaning of the unloading compartment and the discharge of residues of ground product from the discharge aperture 22 even more effective and immediate.

Figure 6:
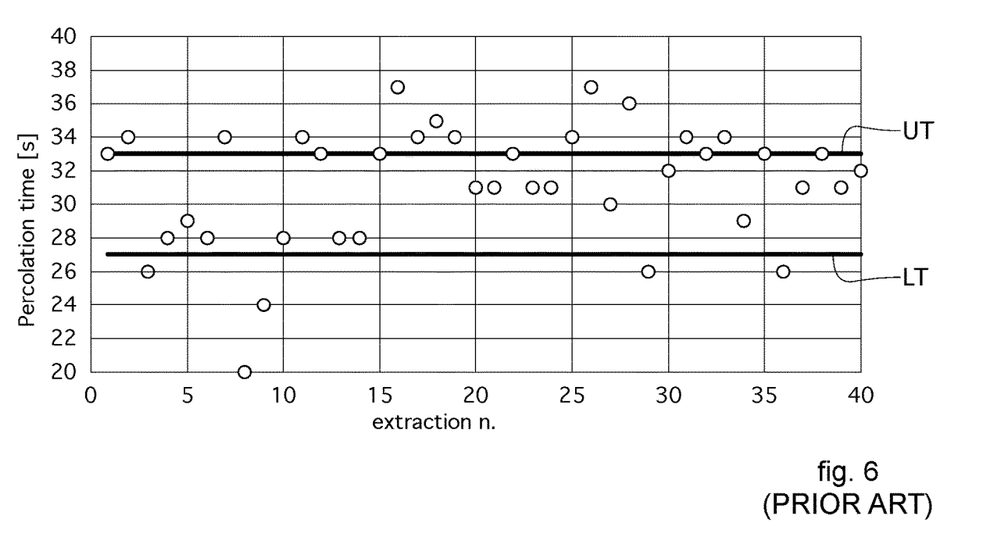

With reference to FIG. 5, it is shown a chart confirming the advantageous effects that can be obtained by the apparatus and method according to the invention. The chart shows the percolation time over time. In the asceses axis there are placed the numbers of extraction. Each extraction is the extraction of a dose of ground coffee prepared by the grinding apparatus 10, 40 in each grinding cycle. The chart visually identify a band defined by an upper threshold UT and a lower threshold LT, inside which the percolation time is considered adequate to give a beverage of good quality. If this is compared with the chart of FIG. 6 showing a typical results of the extraction of the beverage with apparatus and method known in the art, it is very evident that the most of the extractions result in a percolation time that is higher than the upper threshold UT or lower than the lower threshold LT. This reflects the disadvantages of the prior art said above, according to which this extraction cycles outside the band result in a beverage having a bad taste since the ground product lost its organoleptic characteristics for the reason explained in the prior art section.

On the contrary, experimental data collected in FIG. 5 confirms that the grinding apparatus and method of the invention allows to maintain stable the recipe according to which the beverage is obtained, that is function of the weight of the ground product, of the volume of the percolation fluid and of the time of extraction. Thanks to the grinding apparatus and method of the invention the weight of ground product is exactly the amount pre-set by the operator because there are no residues of ground product that remains inside the grinding chamber unloading compartment. It is evident that these residues makes the extraction cycle hard to control, since its amount is not predictable, and modify the weight of ground products through the subsequent extraction cycle.

It is possible, for example, to provide that in the grinding apparatus 10, 40 a grinding button is provided which starts the rotation which is mainly for grinding, for example in the direction of rotation A1, and that, when the button is turned off, the mobile grinder 14 rotates automatically and for a certain period of time in the direction of rotation for cleaning by means of the cleaning device 30, for example in the direction of rotation A2.

It is clear that modifications and/or additions of parts may be made to the apparatus 10, 40 and method for grinding as described heretofore, without departing from the field and scope of the present invention.

It is also clear that, although the present invention has been described with reference to some specific examples, a person of skill in the art shall certainly be able to achieve many other equivalent forms of apparatus 10, 40 and method for grinding, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. Method for use of an apparatus comprising: a receptacle to contain a product to be ground and provided with an unloading aperture; a fixed grinder; a mobile grinder rotatable around a rotation axis connectable to a drive motor; a cleaning device connected to the mobile grinder; a grinding chamber in which the fixed grinder, the mobile grinder and the cleaning device are located and provided with a discharge aperture to discharge the ground product, wherein the method comprises:

- a grinding step during which the drive motor rotates the mobile grinder in a first direction of rotation in which grinding teeth of the mobile grinder engage with grinding teeth of the fixed grinder to ground the product, and in which the cleaning device starts a preliminary unloading step during which a first portion of the ground product is discharged through the discharge aperture,
- a cleaning step in which a commutation device command the drive motor to rotate the mobile grinder in a second direction, opposite the first direction of rotation, in which the grinding teeth of the mobile grinder do not engage with the grinding teeth of the fixed grinder, and in which the cleaning device concludes the unloading step by discharging a second portion of the ground product, wherein the first portion and the second portion are complementary one another and form together a dose of the ground product;
- a de-ionizing step by means of one or more antistatic flaps that eliminate an electrostatic charge associated to particles of the ground product, wherein the one or more antistatic flaps are placed on a discharged path of the ground product and the de-ionizing step is carried out after the ground product passes through the discharge aperture both during the grinding step and the cleaning step.

2. The method of claim 1, wherein during the cleaning step an air flow is generated during the rotation of the mobile grinder in the second direction to help the ground product to leave the grinding chamber and overcoming a braking effect that the one or more antistatic flaps have on the ground product.

3. The method of claim 1, wherein after the cleaning step the commutation device command the drive motor to rotate the mobile grinder in the first direction again and another grinding step of a subsequent grinding cycle starts.

4. The method of claim 1, wherein during both the grinding step and cleaning step the ground product, after passing through the discharge aperture, directly drops inside a vertical nozzle, the vertical nozzle is inclined to the rotation axis of the mobile grinder of a certain angle comprised between 10° and 50°.

5. Apparatus for grinding a product initially in a form of granules or grains, comprising:
- a receptacle to contain a product to be ground and provided with an unloading aperture;
- a fixed grinder;
- a mobile grinder rotatable around a rotation axis and connected to a drive motor,
- a cleaning device connected to the mobile grinder;
- a grinding chamber in which the fixed grinder, the mobile grinder and the cleaning device are located and provided with a discharge aperture for discharging the ground product from the grinding chamber, the fixed grinder and the mobile grinder defining a reception compartment, put in communication with the unloading aperture, and an unloading compartment, separated from the reception compartment by means of grinding teeth of the fixed grinder and the mobile grinder and put in communication with the discharge aperture that is flush with a bottom wall of the unloading compartment, wherein the apparatus comprising:
- a control unit, wherein the control unit is provided with commutation means and associated with the drive motor so as to make the mobile grinder rotate either in a first direction of rotation for a grinding operation or, alternatively, in a second direction of rotation, opposite to the first direction of rotation, for a cleaning operation;
- one or more antistatic flaps that eliminate an electrostatic charge associated to particles of the ground product, wherein the one or more antistatic flaps are placed on the discharged path of the ground product so as to de-ionize the ground product after the ground product passes through a discharge aperture,
- wherein during the grinding operation, the grinding teeth of the mobile grinder are configured to engage with grinding teeth of the fixed grinder, a first portion of the ground product is discharged through the discharge aperture,
- wherein during the cleaning operation, the grinding teeth of the mobile grinder are configured not to engage with the grinding teeth of the fixed grinder, the cleaning device discharges a second portion of ground product, wherein the first portion and the second portion are complementary one another and form together a dose of ground product.

6. The apparatus as in claim 5, wherein said cleaning device comprises at least one cleaning blade which is symmetrical with respect to a radial direction of said cleaning device.

7. The apparatus as in claim 6, wherein said cleaning blade comprises at least a lower cleaning part positioned under the mobile grinder and able to clean the bottom wall, wherein the cleaning part protrudes in the radial direction, and reaches a lateral wall of the unloading compartment so as to clean the bottom wall from residues of ground product.

8. The apparatus as in claim 7, wherein the cleaning blade comprises a lateral cleaning part, connected to the lower cleaning part and protruding axially from the cleaning device in a direction parallel to the rotation axis, wherein the cleaning part is adjacent to the lateral wall for cleaning the lateral wall.

9. The apparatus as in claim 5, wherein the cleaning device comprises three cleaning blades reciprocally distanced at an angle of 120°.

10. The apparatus as in claim 5, wherein the rotation axis represents an inclination axis of a main body of the apparatus with respect to a support surface onto which the main body rests through supporting feet.

11. The apparatus as in claim 10, wherein the rotation axis is inclined with respect to the supporting surface by an angle comprised between 15° and 50°.

12. The apparatus as in claim 10, wherein the rotation axis is substantially orthogonal to a direction along which the grinding chamber is directed, so that the grinding chamber is inclined of a same angle comprised between 15° and 50° with respect to the support surface.

13. The apparatus as in claim 5, comprising a nozzle connected with the discharge aperture through a discharge channel, wherein the nozzle extends in a vertical direction.

* * * * *